(12) United States Patent
Galperin et al.

(10) Patent No.: US 6,901,244 B1
(45) Date of Patent: May 31, 2005

(54) TRAINING SIGNAL IN A SINGLE CARRIER TRANSMISSION

(75) Inventors: Noam Galperin, Maalot (IL); Ariel Zohar, Ramt-Ishy (IL); Yonatan Manor, Haifa (IL); Rafi Reter, Haifa (IL)

(73) Assignee: Oren Semiconductor Ltd., Yoqne'am Illit (IL)

( * ) Notice: Subject to any disclaimer, the term of this patent is extended or adjusted under 35 U.S.C. 154(b) by 581 days.

(21) Appl. No.: 09/693,866

(22) Filed: Oct. 23, 2000

(51) Int. Cl.$^7$ .............................................. H04B 17/00
(52) U.S. Cl. .................. 455/67.14; 455/506; 455/63.1; 375/231
(58) Field of Search ...................... 455/104, 47, 67.14, 455/109, 506, 203, 67.13, 204, 67.11, 424.403, 501, 575, 550, 502, 575.1, 550.1, 67.16, 278.1, 295, 296, 306, 422.1, 8–10, 63.1, 115.2, 115.1; 375/350, 231, 232, 233, 240, 222, 343, 229, 346, 265, 99, 441, 261, 270, 298, 316, 354, 326, 324; 708/300; 370/232, 509, 292, 335, 342

(56) References Cited

U.S. PATENT DOCUMENTS

| | | | | |
|---|---|---|---|---|
| 5,117,291 A | * | 5/1992 | Fadavi-Ardekani et al. | 358/167 |
| 5,278,870 A | * | 1/1994 | Mays et al. | 375/99 |
| 5,491,565 A | * | 2/1996 | Naper | 358/468 |
| 5,930,296 A | * | 7/1999 | Kot | 375/233 |
| 6,256,486 B1 | * | 7/2001 | Barany et al. | 455/296 |
| 6,426,972 B1 | * | 7/2002 | Endres et al. | 375/229 |
| 6,504,578 B1 | * | 1/2003 | Gu | 348/521 |
| 6,526,101 B1 | * | 2/2003 | Patel | 375/240.28 |
| 6,526,105 B1 | * | 2/2003 | Harikumar et al. | 375/350 |
| 6,535,552 B1 | * | 3/2003 | Pessoa | 375/231 |

OTHER PUBLICATIONS

Edlfors et al., "An introduction to Orthogonal Frequency Division Multiplexing", *Research Report/1996:16*, Lulea University, Sweden, (Section 2.1 pp. 4–6; Section 2.2 pp. 8–9).

* cited by examiner

*Primary Examiner*—Edward F. Urban
*Assistant Examiner*—C. Chow
(74) *Attorney, Agent, or Firm*—Browdy and Neimark, P.L.L.C.

(57) ABSTRACT

A system for enhancing the reception of a single carrier signal. The single carrier signal includes periodic training signal and data. The system includes a transmitter configured such that L symbols of either the beginning or end of the N symbols of the training signal, where L<N, are duplicated at either the end or the beginning of the training signal, respectively. The system further includes a receiver configured to receive the modified training signal for the calculation of FIR coefficients in a single pass and without the need for least mean square (LMS) methods or the like.

16 Claims, 7 Drawing Sheets

| A | B | C | D | E | F | G | H |

FIG. 3A

| A | B' | G' | H |

FIG. 3B

TRAINING SIGNAL IN A SINGLE CARRIER TRANSMISSION

FIELD AND BACKGROUND OF THE INVENTION

It is generally accepted that equalization of a single carrier signal is done by an adaptive equalizer. The adaptive equalization can be done on the data as in QAM (Quadrature Amplitude Modulation) based signals or on combination of a special training signal and the data as in VSB (Vestigial Side Band). The equalizer is normally configured in an IIR mode (An FIR plus a feedback equalizer) to provide coverage for long delayed multipath with a minimal number of taps, thus hardware efficient. Learning of the taps values of the equalizing filter is done with the LMS algorithm or some of its variations.

The LMS algorithm is usually applied because of its limited complexity. It is not however optimal in term of channel correction capability. The LMS is a continuous learning and tracking process that does not provide any means of control on the taps value build up. It works excellently in simple conditions, normally found when there is a line of sight to the transmission tower and when an outdoor antenna is used. In many other conditions that are common for TV reception like: indoor antenna use, downtown area surrounded with tall buildings or hilly terrain, the adaptive IIR equalizer with LMS learning algorithm does not always work. Such conditions normally induce short delays which pose difficulty to LMS based algorithms to cope with.

The ATSC standard (Advanced TV System Community), for the DTV transmission (Digital TV) in the USA, is based on VSB modulation that includes a reference signal (referred to also as training signal). The reference signal substitutes the data every 313 segments (312 segments of data and one segment of reference information). The reference signal is made of a training pattern and additional data, using only 2 levels constellations (M=2). The reference pattern assists in the LMS convergence rate. The training pattern is designed for the LMS based algorithms.

A typical VSB technology by an LMS algorithm adapts an equalizer filter taps b, according to the following equations:

$$b_n = b_{n-1} + \mu_n * e_n * x_n$$

$b_n$—The equalizer taps vector at time n.
$b_{n-1}$—The equalizer taps vector at time n-1.
$x_n$—The received signal.
$e_n$—The present equalization error.
$\mu_n$-The algorithm step size, which sets the convergence rate of $b_n$ to the optimal value $b_{opt}$. In order to ensure stable convergence process, $\mu_n$ has to be limited.

Adaptive equalization based on the LMS algorithm suffers from the following disadvantages:
1. Low tracking capability of time varying channel, due to stability condition on $\mu$.
2. Limited performance in present of non line of sight (LOS) channel conditions. The C/N penalty of typical ATSC demodulators increase significantly for Rayleigh channel conditions (low C/E level).
3. Stability loss of the LMS IIR section, in presence of severe indoor conditions.

SUMMARY OF THE INVENTION

There is accordingly a need in the art to provide for a system and method which substantially reduces or eliminates the limitations of hitherto known techniques.

There is a further need in the art to provide for a system and method for obtaining qualitative reception of single carrier signals in general (and VSB in particular) in a non Line-Of-Sight (Non-LOS) conditions (such as indoor conditions).

There is a further need in the art to provide for a system and method that is (are) substantially backward compatible. In other words, the technique of the invention can be incorporated in all those hitherto known VSB signal equipment (receiver/demodulator) which meet a certain very limited constraint posed by the technique of the invention.

It should be noted that when referring to a single carrier signal (or to specific examples of the QAM or VSB (ATSC) signals) it should be understood the term symbol is a base-band symbol. Accordingly, in the context of the invention, transmission of a single carrier signal normally includes e.g. additional steps of interpolation, digital filtering, analog filtering, digital up-conversion, analog up-conversion and D/A conversion, all as known per se and therefore is not expounded upon herein. The same applied to the reception of single carrier signal mutatis mutandis.

It should be noted that the term processor encompasses any known computer system in either stand alone or other architecture. The implementation is accordance with the invention may be in software, hardware or combination thereof.

There is, thus, provided in accordance with the invention a method for enhancing reception of a single carrier signal, the single carrier signal including a periodic training signal and data; the periodic training signal includes N symbols and L symbols L<N that are constituting either start portion or end portion of said N symbols; the method comprising the steps of:
   (a) in respect of each training signal: duplicating said L symbols to the end portion of the training signal if said L symbols constitute a start portion , or otherwise to the start portion of the training signal if said L symbols constitute an end portion, so as to constitute a modified training signal having a duplicated extension; transmitting said single carrier signal;
   (b) receiving said transmitted single carrier signal and in respect of each modified training signal applying the following steps that include:
   (c) calculating at least FIR coefficients utilizing the modified training signal;
   (d) applying to the received single carrier signal at least the FIR using the FIR coefficients in a time domain digital filter.

The invention further provides for use in the method of the kind specified in steps (b) to (d).

In accordance with a preferred embodiment of the invention there is provided a mechanism, which is not LMS based, for better reception of single carrier signals in general, and the VSB signal in particular, based on:
   1. Providing a modified training signal to the transmitted single carrier signal. This is new for single carrier, in general, and to QAM based signal and VSB signal in particular. The signal is built of a training signal plus a duplicated extension as will be described below. This duplicated extension gives substantially clean data, clear of data noise that would otherwise penetrate from adjacent data echoes. This enables fast adaptation rate and eliminates the need for averaging, which implies slower adaptation rate. This step is implemented in a broadcasting side and the single carrier signal with the modified training signal is transmitted. The following steps are implemented in the receiving side and applied to the so received single carrier signal.

2. Optionally, calculation of exact channel model, based on the duplicated extension in the modified training signal. By one modified embodiment this is implemented by frequency domain processing, using an FFT and an inverse FFT operations or by another modified embodiment time domain processing, by using cross correlation operation.

3. Using FFT and IFFT for FIR coefficients calculations. The separation to FIR calculations and IIR (Feedback) calculations provides a robust solution. In accordance with one embodiment only FIR is utilized for removing short delays. Such delays may be induced by e.g. difficult environmental conditions, such as the specified indoors receipt antenna conditions. In accordance with a modified embodiment where there exist also long delays (induced e.g. by relatively far objects such as mountains) IIR should preferably utilized.

4. For the latter modified embodiment, using the FFT and inverse FFT in a second iteration the feedback IIR coefficients are calculated based on the residue after the computed FIR is applied. By a specific embodiment, the calculation of the residue is based on the so calculated channel model.

Accordingly, in accordance with the invention, there is further provided a method for enhancing reception of a single carrier signal, the single carrier signal including a periodic training signal and data; the periodic training signal includes N symbols and L symbols L<N that are constituting either start portion or end portion of said N symbols; the method comprising the steps of:

(a) in respect of each training signal: duplicating said L symbols to the end portion of the training signal if said L symbols constitute a start portion, or otherwise to the start portion of the training signal if said L symbols constitute an end portion, so as to constitute a modified training signal having a duplicated extension; transmitting said single carrier signal;

(b) receiving said transmitted single carrier signal and in respect of each modified training signal applying the following steps that include:

(c) calculating FIR coefficients utilizing said modified training signal;

(d) calculating a residue signal using FIR with said FIR coefficients;

(e) calculating feedback coefficients (IIR) based on said residue; and (f) applying to the received single carrier signal the IIR and FIR using the respective IIR coefficients and FIR coefficients in a time domain digital filter.

The invention further provides for use in the method of the kind specified in steps (b) to (f)

The invention further provides for a system for enhancing reception of a single carrier signal, the single carrier signal including a periodic training signal and data; the periodic training signal includes N symbols and L symbols L<N that are constituting either start portion or end portion of said N symbols; the system comprising:

a processor and associated transmitter configured, in respect of each training signal, to: duplicating said L symbols to the end portion of the training signal if said L symbols constitute a start portion, or otherwise to the start portion of the training signal if said L symbols constitute an end portion, so as to constitute a modified training signal having a duplicated extension; transmitting said single carrier signal;

a processor and associated receiver configured to: receiving said transmitted single carrier signal and in respect of each modified training signal applying the following calculation that include:

calculating FIR coefficients utilizing said modified training signal;

calculating a residue signal using FIR with said FIR coefficients;

calculating feedback coefficients (IIR) based on said residue; and applying to the received single carrier signal the IIR and FIR using the respective IIR coefficients and FIR coefficients in a time domain digital filter.

By a modified embodiment, the use of FIR is obviated and only IIR is utilized. This embodiment is of particular useful in the case that long delays and substantially no short delays are induced to so received single carrier signal.

Accordingly, the invention provides for a method for enhancing reception of a single carrier signal, the single carrier signal including a periodic training signal and data; the periodic training signal includes N symbols and L symbols L<N that are constituting either start portion or end portion of said N symbols; the method comprising the steps of:

(a) in respect of each training signal: duplicating said L symbols to the end portion of the training signal if said L symbols constitute a start portion, or otherwise to the start portion of the training signal if said L symbols constitute an end portion, so as to constitute a modified training signal having a duplicated extension; transmitting said single carrier signal;

(b) receiving said transmitted single carrier signal and in respect of each modified training signal applying the following steps that include:

(c) calculating at least IIR coefficients utilizing the modified training signal; and (d) applying to the received single carrier signal at least the IIR using the IIR coefficients in a time domain digital filter.

The invention further provides for use in the method of the kind specified in steps (b) to (d).

The invention further provides for a method for processing a single carrier signal, the single carrier signal including a periodic training signal and data; the periodic training signal includes N symbols and L symbols L<N that are constituting either start portion or end portion of said N symbols; the method comprising the step of:

(a) in respect of each training signal: duplicating said L symbols to the end portion of the training signal if said L symbols constitute a start portion, or otherwise to the start portion of the training signal if said L symbols constitute an end portion, so as to constitute a modified training signal having a duplicated extension.

BRIEF DESCRIPTION OF THE DRAWINGS

For a better understanding, the invention will now be described by way of example only, with reference to the accompanying drawings, in which:

FIGS. 3A–B illustrate schematically a hitherto known training signal in the first segment of every field in an ATSC signal and a modified training signal in the first segment of every field in an ATSC signal in accordance with a preferred embodiment of the invention;

DETAILED DESCRIPTION OF PREFERRED EMBODIMENTS

Figure 1:
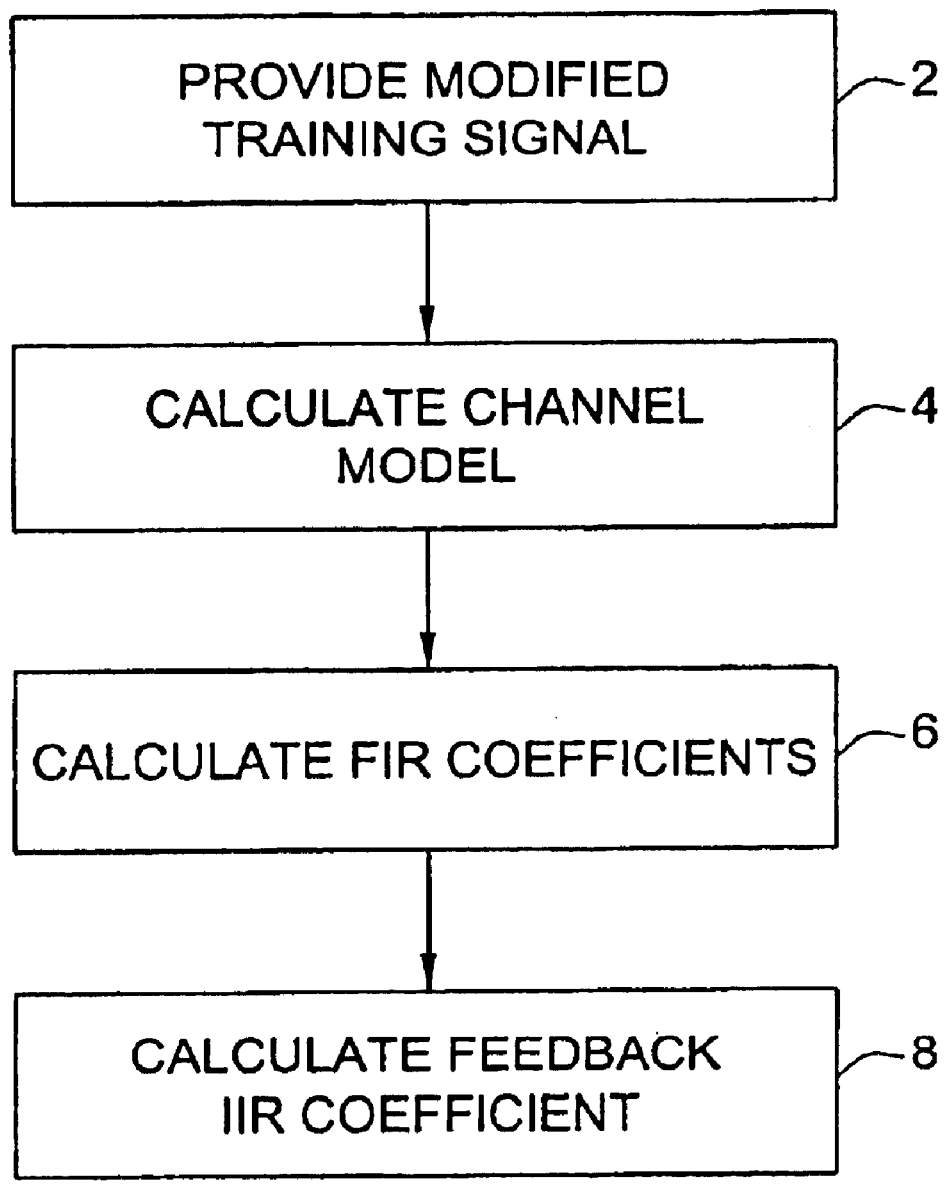
FIG. 1 is a generalized flow diagram of the operational steps in accordance with a preferred embodiment of the invention.

As specified above, in accordance with a specific preferred embodiment of the invention (described with reference to FIG. 1) there is provided a mechanism, which is not LMS based, for better reception of single carrier signals in general, and the VSB signal (according to ATSC standard) in particular, based on:

1. Providing a modified training signal to the transmitted single carrier signal (2). This is new for single carrier, in general, and to QAM based signal and VSB signal in particular. The signal is built of a training signal plus a duplicated extension as will be described below. This duplicated extension gives substantially clean data, clear of data noise that would otherwise penetrate from adjacent data echoes. This enables fast adaptation rate and eliminates the need for averaging, which implies slower adaptation rate. This step is implemented in a broadcasting side and the single carrier signal with the modified training signal is broadcasted. The following steps are implemented in the receiving side and applied to the so received single carrier signal.

2. Optionally, calculation of exact channel model (4), based on the duplicated extension in the modified training signal. By one modified embodiment this is implemented by frequency domain processing, using an FFT and an inverse FFT operations or by another modified embodiment time domain processing, by using cross correlation operation.

3. Using FFT and IFFT for FIR coefficients calculations (6). The separation to FIR calculations and IIR (Feedback) calculations provides a robust solution. In accordance with one embodiment only FIR is utilized for removing short delays. Such delays may be induced by e.g. difficult environmental conditions, such as the specified indoors receipt antenna conditions. In accordance with a modified embodiment where there exist also long delays (induced e.g. by relatively far objects such as mountains) IIR should preferably utilized.

4. For the latter modified embodiment, using the FFT and inverse FFT in a second iteration the feedback IIR coefficients are calculated (8) based on the residue after the computed FIR is applied. By a specific embodiment, the calculation of the residue is based on the so calculated channel model.

The first step (2) involves the construction of modified training signal, which by one embodiment is based on:

1. A random training sequence of length N, like the PN511 signal (Pseudo-Random Noise) in VSB. is modified to $2^n$-length series. Thus, in the case of PN 511 additional symbol, say 0 is padded as an Least Significant Symbol, brining about a 512 ($2^9$-length) series.

2. L symbols from among the N symbols, L<N (constituting a start portion), preferably the first L symbols of the N symbols are duplicated to the end portion of the training signal (constituting a duplicated extension). Preferably, the duplicated extension are appended immediately following the N symbols (512 length in the example of 1 above) constituting, thus, a cyclic repetition (or cyclic extension).

3. The modified training signal is repeated in a predetermined rate inside the transmitted signal, e.g. in the case of VSB, each 313 segments.

The so calculated modified training signal facilitates direct calculation of the channel model with no distortion from the penetration of data symbols echoes up to L symbols long (Pre-echoes and post-echoes together). The length L of the cyclic repetition provides uniform coverage for channel multipath up to a duration of the symbol rate times L.

Since the VSB signal already contains a training signal, tie goal is to make the proposed modified training signal, as similar as possible to the original signal, with as much as possible backward compatibility (with VSB receiver/demodulator equipment) to the current signal.

As is well known, the ATSC signal is built of frames that are divided into 2 fields, an even field and an odd field. Each field is further divided into 313 segments of 832 symbols. The first segment in every field contains a training signal that will now be described with reference to FIG. 3A, where:

A—signifies 4 symbols segment sync.
B—signifies 511 symbols of the PN511 training signal.
C—signifies 63 symbols of the PN63 training signal.
D—signifies 63 symbols of the PN63 training signal. Alternate polarity every field.
E—signifies 63 symbols of the PN63 training signal.
F—signifies 24 symbols VSB mode.
G—signifies 92 unused symbols.
H—signifies 12 symbols for trellis coding.

The other 312 segments contain the 4 symbols segment sync plus 828 symbols of data.

The usage of parts [C,D,E] is difficult for channel equalization in terrestrial use with long multipath, because of the short repetition cycle and the toggling polarity. These short trainings were originally intended for the cable VSB16 application where fine equalization is required in short multipath conditions. Since the VSB system is now applied in a single mode only for the terrestrial transmission, the 24 symbols of the VSB mode represent only a single mode of operation and therefore have no utility.

Figures 3A, 3B:
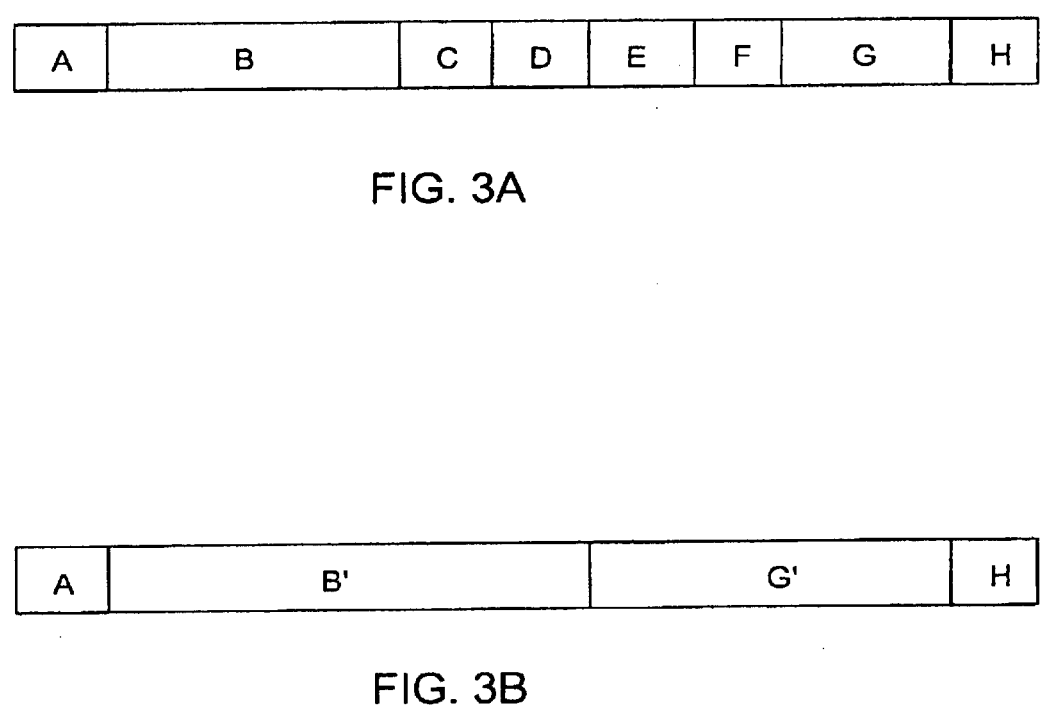

Thus, in accordance with a specific preferred embodiment of the invention the 305 symbols (i.e., C,D,E,F and G) which are hardly used with VSB systems are used as an end portion of the PN511, constituting one form of a modified training signal. Thus, and as shown in FIG. 3b, there is provided the following reference signal:

A—4 symbols segment sync.
B'—512 symbols of the PN511 training signal.
G'—305 symbols, which equals the first 305 symbols of B.
H—12 symbols for trellis coding.

Note that B' stands for B+"padded symbol" (say 0) so as to constitute $2^D$—length series, which is necessary for the subsequent FFT implementation B'+G' are 816 symbols long or shorter. Each of them can have a different length, other than 511 and 305 respectively, as long as they keep the rule above. Thus, if B' stands for 512 then G' is reduced to 304.

The modified training signal (The basic PN511 plus its cyclic repetition) has the unique characteristics of cyclic behavior. This facilitates direct and exact calculation of the channel model (see "An Introduction to Orthogonal Frequency Division Multiplexing", Research Report/1996:16, Lulea University, Sweden), with no distortion from the penetration of data symbols echoes up to 305 symbols long (Pre ghosts [echoes] and post ghosts together). It should be noted that the direct calculation may be realized in time domain (e.g. cross-correlation calculation) or frequency domain (e.g. FFT calculation). It should be further noted that the cyclic characteristics does not take in account the pre-pending 'A' portion and the appended 'H' portion.

The 305 length of the cyclic repetition provides uniform coverage for channel multipath up to a length of 28.34 μsec (the symbol rate is 10.7622 MhZ and accordingly 305 symbols are extended over a time interval of 28.34 μsec.

It should be noted that by this embodiment the modification of only the training signal extension makes it backward compatible to many existing demodulator VSB equipment that are commercially available in the market. The latter is based on the assumption that end portion (portion C-G in FIG. 3A, now forming the duplicated extension) is not used due to the limited application of the VSB for other than terrestrial transmission in the USA, where VSB operates in the VSB8tr mode only. Put differently, as long as the commercially available demodulators meet the constraint that the L symbols (e.g. 305) in the suffix are not used, the proposed technique is backward compatible and can be used with commercially available demodulators.

It should be noted that by this example L=305 and N=511. Those versed in the art will readily appreciate that other modifications may apply.

By this example the 305 prefix symbols were duplicated at the end portion (constituting one form of said cyclic extension), which in the case of VSB signal constitutes an advantage insofar as down compatability is concerned.

It is recalled that in the general case of a single carrier signal it is not necessarily to provide the duplicated extension at the end portion and accordingly by a modified embodiment, the end portion of the N symbols are duplicated in the start portion thereof.

As specified above, whereas the modified training signal is applied to VSB signal, those versed in the art may readily appreciate that it may be applied to any other single carrier signal such as and not limited to QAM.

The construction of the modified training signal is realized at the transmitting side, e.g. at the broadcasting station, whereas the processing of the training signal (as will be explained in detail below) is realized at the subscriber side.

The size (N) of the training signal limits the length of each one the FIR filter and the IIR filter. The size of the cyclic extension (L) determines the maximal ghosts delays (echoes), which can be handled, both pre and post ghosts. The rate of repetition of the reference signal determines the dynamics, which can be handled. Without the duplicated extension averaging is required (as is the case in the prior art solutions), which means both less quality solution and slower adaptation rate.

There are various utilities for the specified modified training signal. Thus, in accordance with a non-limiting preferred embodiment, the training signal is utilized for the construction of a channel model.

In accordance with another non-limiting preferred embodiment, the specified modified training signal is utilized for enhancing the quality of the received single carrier data by using FIR filtering, or IIR filtering or both for equalizing the received data (i.e. attenuating channel echoes) even in difficult environmental conditions.

There will now described with reference to FIGS. 2 and 4–10, a specific preferred embodiment where the so received VSB signal will be enhanced so as to accomplished equalizing calculation. There will be further shown exact model calculation, which may be used as one out of few possible variants to calculate the residue. The exact model calculation exploits the modified training signal. By this embodiment, the processing steps (4, 6 and 8 described above with reference to FIG. 1) are performed at the subscriber side on received signal having already incorporated therein the modified training signal.

The channel model calculation (4 in FIG. 1) may be calculated in the Frequency domain (e.g. using FFT and inverse FFT operations) or in the time domain (e.g. using cross correlation operations).

Figure 2:
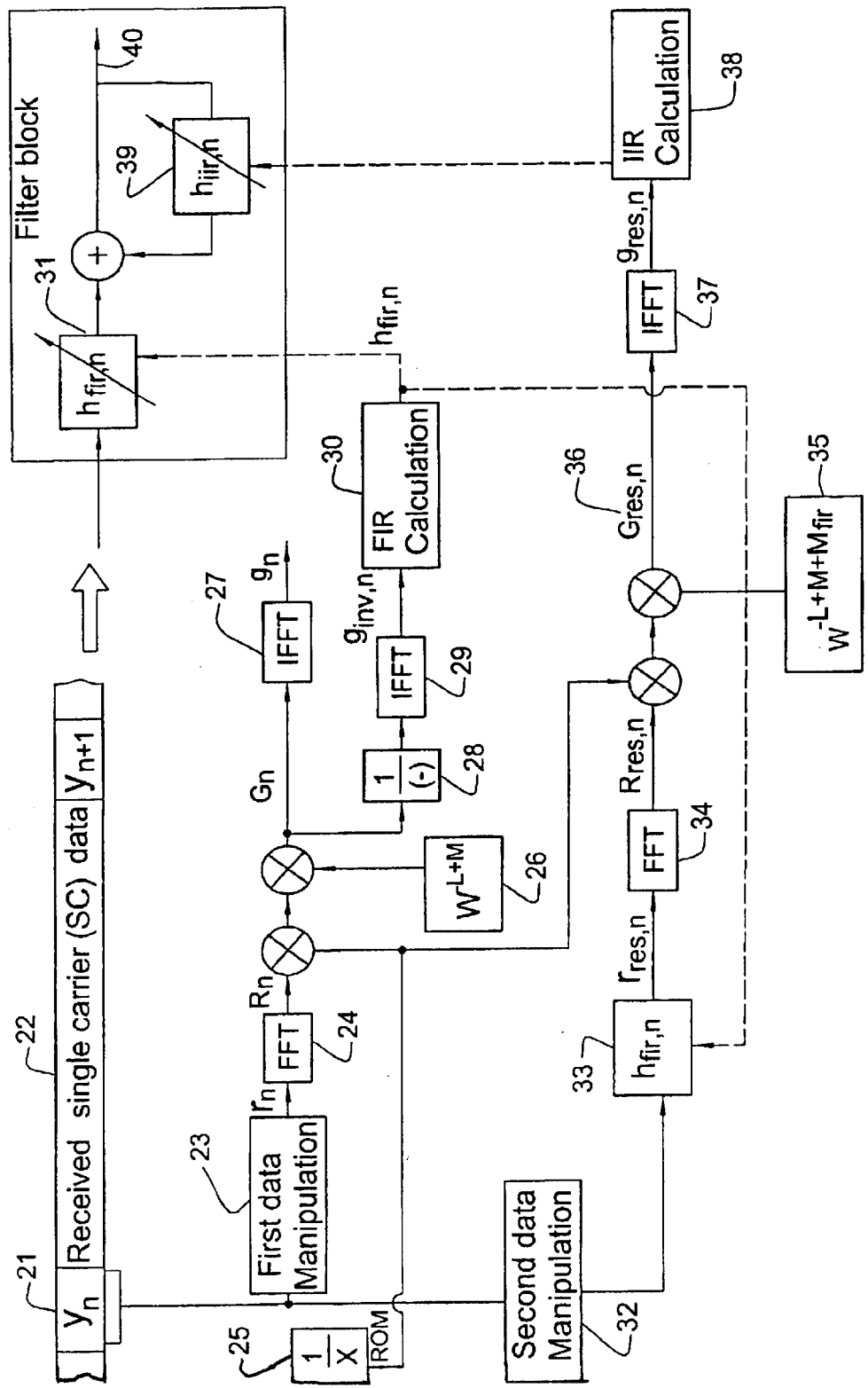
FIG. 2 is a generalized block diagram of a system according to a preferred embodiment of the invention.

Before turning to the description of the channel model with reference to FIG. 2, it should be noted that the embodiment of FIG. 2 is only an example and the invention is by no means bound thereby. Thus, consider the following definitions:

N—The length of the training signal. In the VSB signal it is 511, which is the length of PN511. For an efficient use of Radix-2 FFT machine, and with no loss of generality, N can be set to 512 by padding the PN511 sequence with one zero at its end. For convenience, the PN511 after the padding of zero will also referred to as PN511.

L=816-N, the total data penetration allowed (pre plus post ghosts).

$x_{cyc}$=[PN511, PN511 (0:L−1)], the extended training signal of length 816. Note that the $x_{cyc}$ is the modified training signal that includes the duplicated portion which was introduced to the VSB signal at the broadcasting station.

Figure 4:
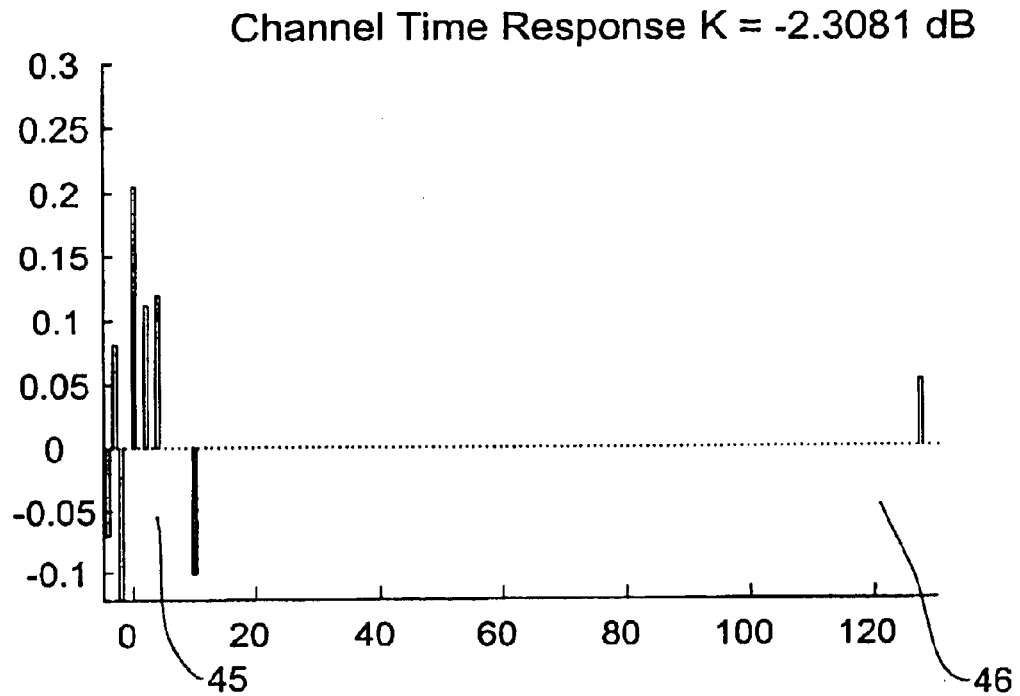
FIG. 4 is a graph representation of Channel impulse response, as measured by 'ideal' channel-analyzer.

X=$FFT_N$(PN511), g—The equivalent discrete Base-Band channel impulse response of length L (pre plus post taps). This is the model of the channel ghosts. If it is longer than L, some noise (due to data penetration) will be added and it will be required to start averaging techniques, which will slow down the process. FIG. 4 illustrates such a simulated channel impulse response where as measured by 'ideal' channel-analyzer. As shown, the channel time response at (45) corresponds to the short delays, whereas (46) for the long delays.

$y_n$—The response (base-band) of g to $x_{cyc}$. This is the n'th received reference segment of length 916+L−1. It is assumed that $y_n(0)$ corresponds to $x_{cyc}(0)$, Note that the $y_n$ "incorporates" the modified training signal after being subject to channel response.

$W_N(k)=e^{j*2**k/N}$, k=0,1,2, ... N−1.

M—Maximum backwards data penetration (Pre ghosts). M is determined through energy calculations and is not expounded upon herein as this matter is beyond the scope of the present invention.

On the basis of the foregoing definitions, the process of channel model calculation in accordance with one embodiment will now be described with reference also to FIG. 2. As shown, each segment is constituted by the $y_n$ response (21) (signifying the so received modified training signal) and the successive received single carrier data (22), in a repetitive manner.

Figure 5:
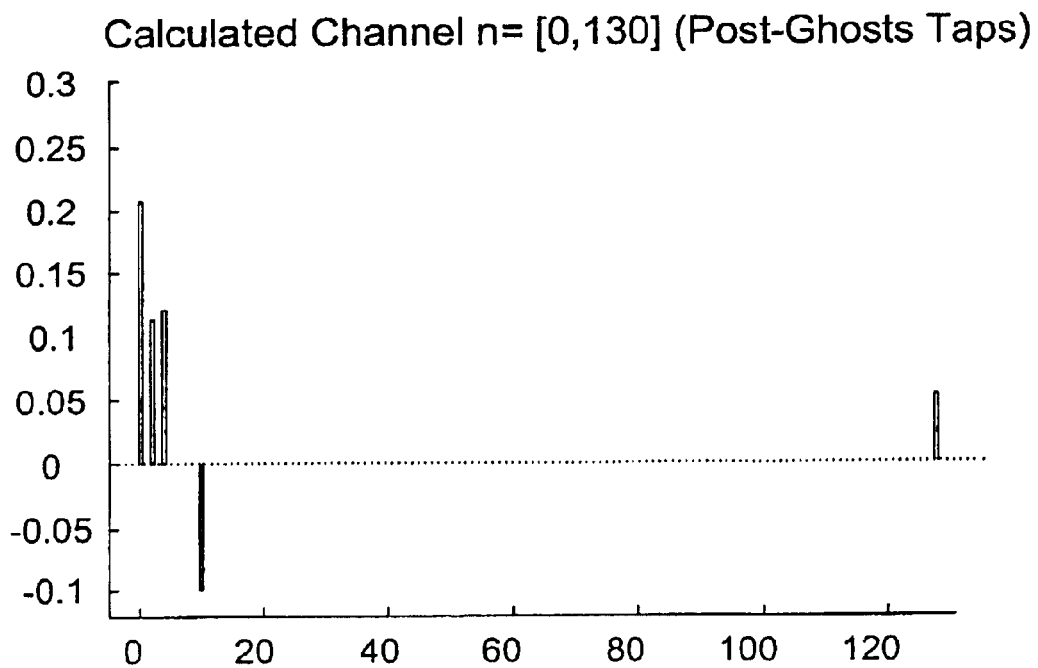
FIG. 5 is a graph representation of Channel impulse response IDFT, $g_n$, showing the $1^{th}$ 1.30 IDFT elements, corresponding to the post taps of the channel, calculated according to a preferred embodiment of the invention.
Figure 6:
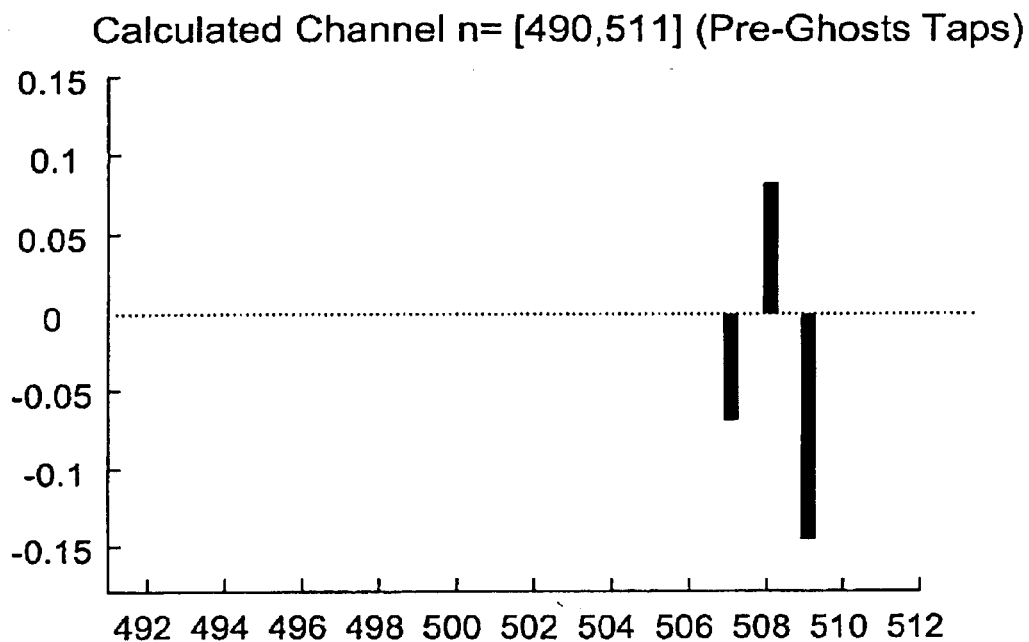
FIG. 6 is a graph representation of Channel impulse response IDFT $g_n$, showing the last [490:511] IDFT elements, containing the pre taps of the channel, calculated according to a preferred embodiment of the invention.

For each reference segment (modified training signal) n. n=0,1,2, . . . :

1. Record $r_n=y_n(L-M:L+N-1-M)$ of length N, (designated first data manipulation block 23).
2. Compute $R_n=FFT_N(r_n)$ (block 24).
3. Thereafter, compute the channel DFT $G_n(k)=(R_n(k)/X(k))*W_N(k)^{-L+M}$, k=0,1,2, . . . N−1. (i.e. multiplying $R_n$ by the contents of blocks (25) and (26), giving rise to $G_n(k)$)
4. Compute the channel model $g_n=IFFT_N(G_n)$, (27). The resulting model channel is illustrated in FIGS. 5 and 6.

It should be noted that the effect of the periodic extension is similar to that of the cyclic prefix used in the DVB-T OFDM (see "An Introduction to Orthogonal Frequency Division Multiplexing", Research Report/1996:16, Lulea University, Sweden). It means that the DFT of the received signal $r_n$, equals by definition to the DFT's product of the reference signal PN511 and the channel impulse response g (padded by N-L zeros). As specified above, in order to maintain downward compatibility the start portion is appended to the end portion in the VSB signal (in contrast to the specified DVB-T OFDM application).

It has to be noted, that $g_n$ is the N-length cyclic version of the linear impulse response g, i.e., an m-length pre-tap of g appears as $g_n(N-m)$.

As an example in the VSB transmission, the channel model calculation technique is accurate, and supports channel coverage up to L=304 taps, which equals to 28.25 sec echoes. There is no need to average measured reference for data penetration, because the duplicated extension prevents data penetration into $r_n$. It also supports high rate dynamic channel tracking, limited by the reference segment rate and the actual noise level. As an example for 8-VSB ATSC signal, this rate can approach up to 4 Hz (being one-tenth of the training signal repartition rate; by the example above the repetition rate being each 313 segments).

There follows the step of calculating FIR coefficients (8 in FIG. 1). As specified above, for the purpose of FIR calculation the channel model calculation step is not necessarily required.

5. Thus, Compute the inverse channel model $g_{inv,n}=IFFT_N(1/G_n)$ (blocks 28 and 29).
6. Next, set the FIR equalizer coefficients $h_{fir,n}$ of length $N_{fir,}\leq N$ (block 30).

Figure 7:
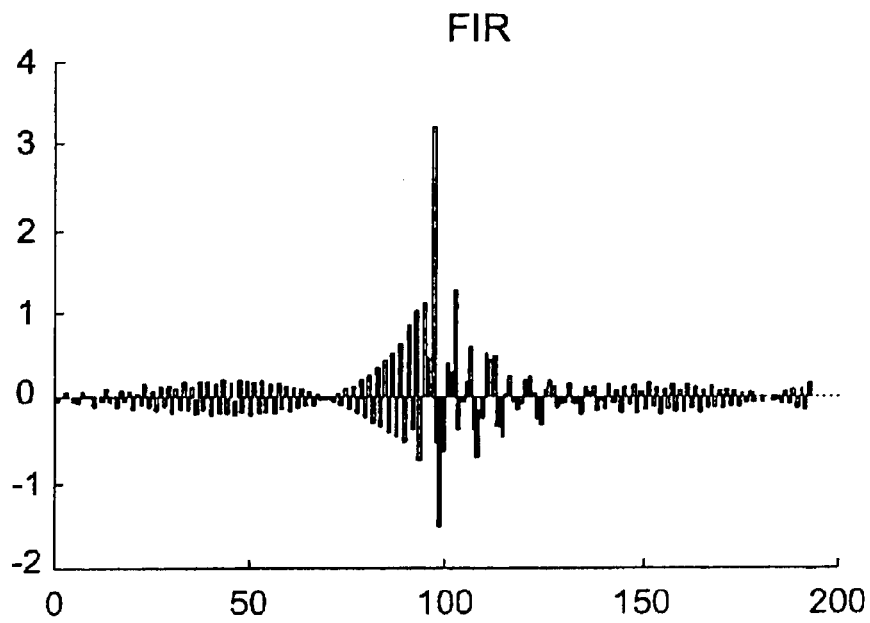
FIG. 7: is a graph representation of FIR section impulse response $h_{fir,n}$, calculated according to a preferred embodiment of the invention.
Figure 8:
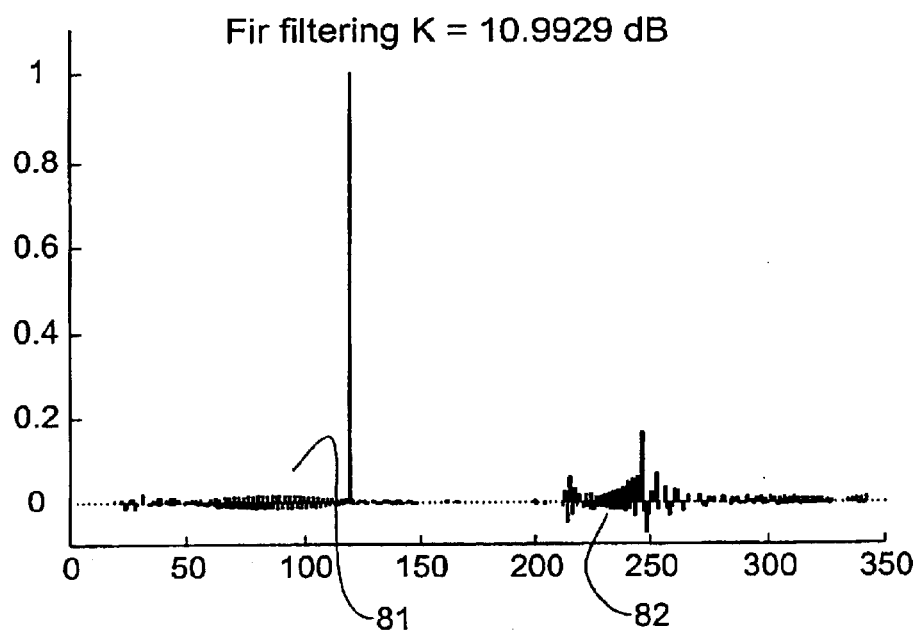
FIG. 8: is a graph representation of Channel impulse response, after FIR equalization. K-factor is increased by 13.3 dB, and equals 11 dB, calculated according to a preferred embodiment of the invention.

It should be noted that the FIR equalizer taps $h_{fir,n}$ are set based on the inverse channel $g_{inv,n}$, according to some criterion based on the shape of the channel model $g_n$. For example, in the presence of short non line-of-sight (LOS) channel, a full FIR structure of N taps will be used. Using both FIR and IIR feedback sections treats short clustered echoes, mixed with additional long ones. The FIR part eliminates the clustered echoes. The resulting FIR coefficients are illustrated in FIG. 7.

7. Now, Define $0\leq M_{fir}\leq N_{fir}$ as the $h_{fir,n}$ center-tap delay.

Figure 9:
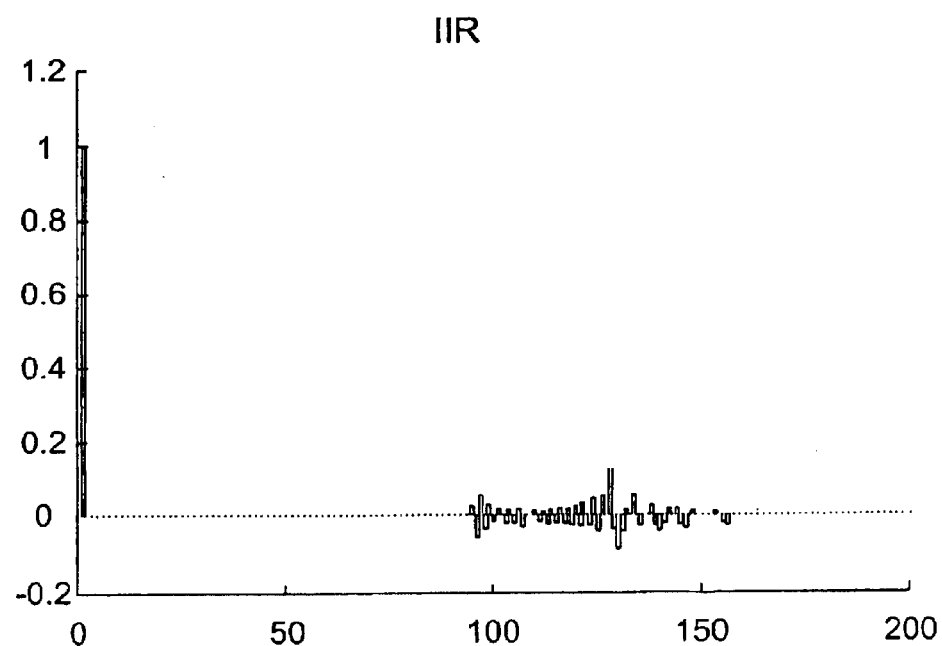
FIG. 9: is a graph representation of IIR section impulse response $h_{iir,n}$, calculated according to a preferred embodiment of the invention.
Figure 10:
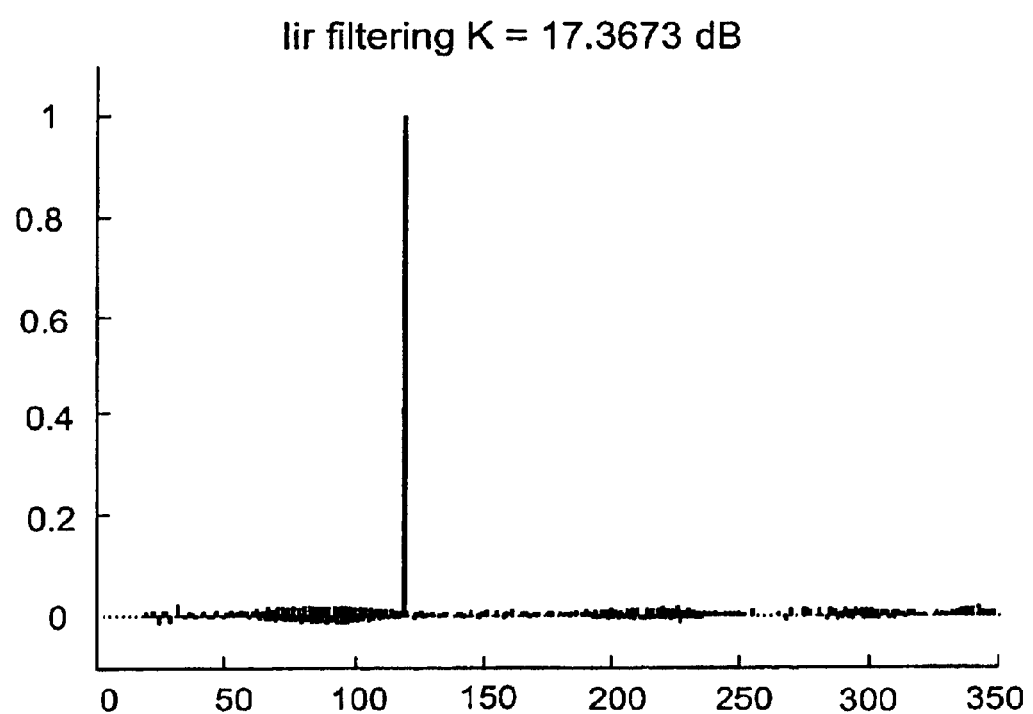
FIG. 10: is a graph representation of Channel impulse response, after IIR equalization, where K-factor is increased by additional 6.37 dB, and equals 17.37 Db, calculated according to a preferred embodiment of the invention.

Had it been that only short delays are encountered it would be sufficient to apply tie FIR coefficients on the received single carrier signal (31). If however also long delays are encountered an HR filter should also be exploited. This necessitates calculation of IIR (Feedback portion) (39) coefficients calculations. To this end the residue after applying the FIR should be calculated. One out of few possible approaches includes:

1. Compute res=conv($[r_n(N-N_{fir}:N-1), r_n(0:N-1)], h_{fir,n}$), of length $2*N_{fir}+N-1$. It is the response of $h_{fir,n}$ to the cyclic prefix extension of $r_n$. (block 32—designating second data manipulation which encompasses the calculations embraced by the square brackets above; and block 33)
2. Compute $R_{res,n}=FFT_N(r_{res,n})$, where $r_{res,n}=res(N_{fir}:N_{fir}+N_r-1)$, of length N. (block 34)
3. Compute the residual channel DFT, $G_{res,n}(k)=(R_{res,n}(k)/X(k))*W_N(k)^{Mfir+L-M}$, k=0,1,2, . . . N−1. (the result of multiplying $R_{res,n}(k)$ by tie contents of blocks (25) and (35), giving rise to $G_{res,n}(k)$ (36).
4. Compute the residual channel model $g_{res,n}=IFFT_N(G_{res,n})$. (block 37), brings about the residue depicted in FIG. 8. Due to offset along the time ordinate, the area (81) corresponds to (45 in FIG. 4) and the area (82) corresponds to (46 in FIG. 4). As shown due to the FIR operation, the short delays at (81) are substantially eliminated, whereas the long delays (82) need still to be treated.
5. Next, set the IIR equalizer $h_{iir,n}$ of length $N_{iir,}\leq N$, according to the specific structure of $g_{res,n}$. (block 38). The resulting IIR coefficients are illustrated in FIG. 9. Applying the IIR filter with the so calculated IIR coefficients (39), would eliminate or reduce the long delays (as shown in FIG. 10).

The proposed approach results with more stable FIR equalization design relative to the LMS one. Combining FIR equalization with post residual IIR (feedback) equalization, gives high performance in presence of severely condition as non line of sight channel.

It should be noted that tap division between FIR and IIR taps provides flexibility of implementation, from normal configuration with short forward FIR section and long feedback section, all the way to a long FIR with no feedback filter. Those versed in the art will readily appreciate that in the case of short delays (either pre or post echoes) an FIR filter should be employed. In the case that long delays (post echoes) a very long FIR is required, which, inter alia, is very costly. In the latter scenario, the FIR solution leaves residue ghosts, so the IIR part will be required instead of the FIR From the foregoing discussion it readily arises that depending upon the particular application only FIR filter, only IIR filter or both can be used.

Those versed in the art will readily appreciate that the invention is not bound by any particular implementation of FIR and/or IIR filters and any known per se implementation thereof is applicable.

FIG. 10 illustrates the long and short echoes reduction extent in the specific example described with reference to FIGS. 2 to 9. Thus C/E ratio (reflected by the K factor defined below) equals −2.308 dB (FIG. 4) as compared to C/E ratio of K=17.37 dB (FIG. 10), bringing about 20 dB improvement.

The following exemplary numeric value were utilized in the example above,

Channel

The channel impulse response sequence g(n) has a $K_{factor}$ of a −2.3 dB, where $$K_{factor}=20\cdot\log_{10}(|g(0)|^2/\Sigma_{n=0}|g(n)|^2)$$

The channel contains one cluster around the main path (taps n≠4 to 10), which is followed by one additional post ghost (tap n=127).

Reference signal:
   N=511.
   L=300.
   M=50.
FIR section:
   $N_{fir}$=192
   $M_{fir}$=96
IIR section:
   $N_{iir}$=192.

In the following, alphabetic characters and roman symbols are used in the method steps for convenience only and do not necessarily imply any particular order of the method steps, The present invention bas been described with a certain degree of particularity, but those versed in the art will readily appreciate that various alterations and modifications may be carried out without departing from the scope of the following claims:

What is claimed is:

1. A method for enhancing reception of a single carrier signal, the single carrier signal including a periodic training signal and data; the periodic training signal includes N symbols and L symbols L<N that are constituting either start portion or end portion of said N symbols; the method comprising the steps of:
   (a) in respect of each training signal: duplicating said L symbols to the end portion of the training signal if said L symbols constitute a start portion, or otherwise to the start portion of the training signal if said L symbols constitute an end portion, so as to constitute a modified training signal having a duplicated extension; transmitting said single carrier signal;
   (b) receiving said transmitted single carrier signal and in respect of each modified training signal applying the following steps that include:
      (b1) calculating FIR coefficients utilizing said modified training signal;
      (b2) calculating a residue signal using FIR with said FIR coefficients;
      (b3) calculating feedback coefficients (IIR) based on said residue; and
      (b4) applying to the received single carrier signal the IIR and FIR using the respective IIR coefficients and FIR coefficients in a time domain digital filter.

2. The method according to claim 1, wherein said calculating a FIR coefficients stipulated in step (b1) includes using FFT and IFFT in said calculation.

3. The method according to claim 1, wherein said calculating the feedback coefficients (IIR) stipulated in said step (b3) includes using FFT and IFFT in said calculation.

4. The method according to claim 1, wherein said calculating step stipulated in (b3) includes applying said FIR to the modified training signal so as to obtain said residue.

5. The method according to claim 1, wherein said single carrier being a VSB (ATSC) signal.

6. The method according to claim 5, wherein the ATSC signal includes frames that are divided into 2 fields, an even field and an odd field; each field is further divided into 313 segments of 832 symbols each; the first segment in every field contains a modified training signal that consists of:
   A—signifies 4 symbols segment sync;
   B—signifies 511 symbols of the PN511 training signal;
   C—signifies 63 symbols of the PN63 training signal;
   D—signifies 63 symbols of the PN63 training signal;
   Alternate polarity every field;
   E—signifies 63 symbols of the PN63 training signal;
   F—signifies 24 symbols VSB mode;
   G—signifies 92 unused symbols;
   H—signifies 12 symbols for trellis coding;
The other 312 segments contain the 4 symbols segment sync plus 828 symbols of data; said N=511 and L=305.

7. The method according to claim 5, wherein said duplicated extension being the end portion.

8. The method according to claim 5, wherein said step (a) includes:
   (a) modifying the N symbols to a $2^n$ length series;
   (b) duplicating L symbols (L<N) from among a start portion of the resulting N symbols in (1), to the end portion of the training signal so as to give rise to a duplicated extension in a modified training signal;
   (c) repeating the modified training signal in a predetermined rate inside the single carrier signal.

9. The method according to claim 1, wherein said single carrier signal being QAM signal.

10. The method according to claim 1, wherein said duplicated extension being the end portion.

11. For use in the method of claim 1, said steps (b1) to (b4).

12. The method according to claim 1, wherein said FIR coefficients and said IIR coefficients are calculated in a single pass.

13. A method for enhancing reception of a single carrier signal, the single carrier signal including a periodic training signal and data; the periodic training signal includes N symbols and L symbols L<N that are constituting either start portion or end portion of said N symbols; the method comprising the steps of:
   (a) in respect of each training signal: duplicating said L symbols to the end portion of the training signal if said L symbols constitute a start portion, or otherwise to the start portion of the training signal if said L symbols constitute an end portion, so as to constitute a modified training signal having a duplicated extension; transmitting said single carrier signal;
   (b) receiving said transmitted single carrier signal and in respect of each modified training signal applying the following steps that include:
      (b1) calculating at least FIR coefficients utilizing the modified training signal;
      (b2) applying to the received single carrier signal at least the FIR using the FIR coefficients in a time domain digital filter.

14. The method according to claim 13, further including calculating at least IIR coefficients utilizing the modified training signal, and wherein said step (b2) includes applying to the received single carrier signal at least the FIR using the FIR coefficients and the IIR using the IIR coefficients in a time domain digital filter, so as to obtain a single carrier signal.

15. For use in the method of claim 13, said steps (b1) to (b2).

16. The method according to claim 13, wherein said FIR coefficients are calculated in a single pass.

* * * * *